Figure 17:

(No Model.) 4 Sheets—Sheet 1.
E. E. L. & I. D. BOYER.
WRAPPING MACHINE.
No. 568,656. Patented Sept. 29, 1896.
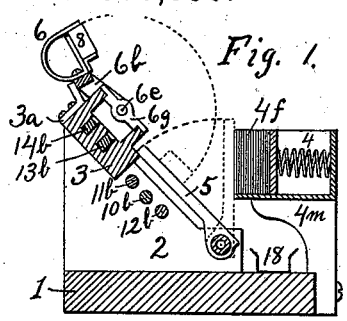
Fig. 1.
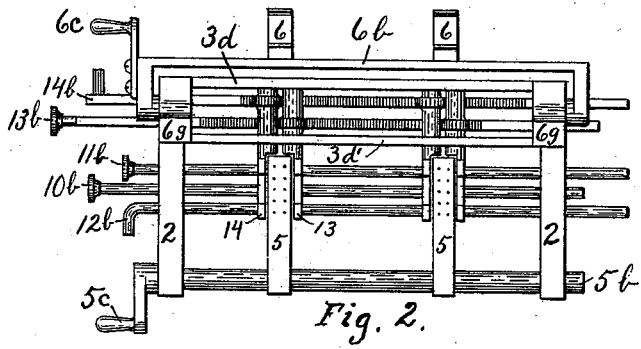
Fig. 2.
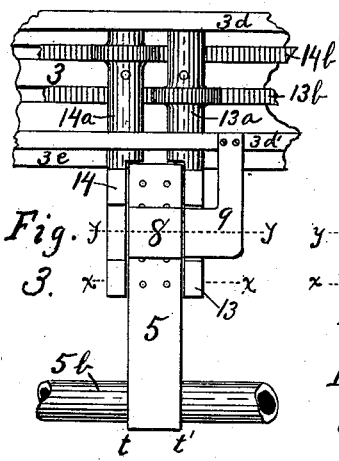
Fig. 3.
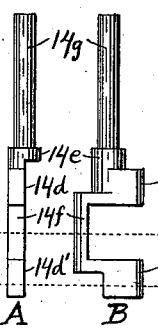
Fig. 5.
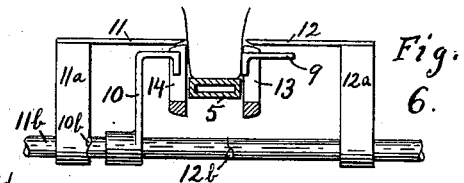
Fig. 6.
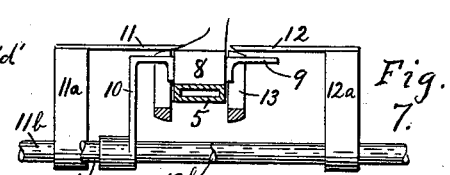
Fig. 7.
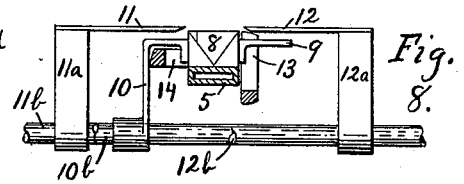
Fig. 8.
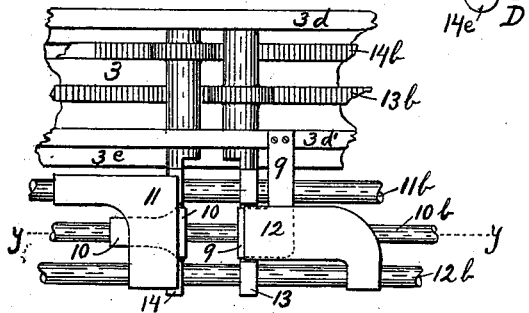
Fig. 4.
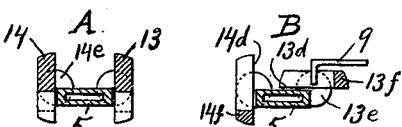
Fig. 9.
Fig. 10.
WITNESSES:
Claude T. Johnson
Bertha P. Longstreth
INVENTORS
Edith E. L. Boyer
Israel Donald Boyer (No Model.) 4 Sheets—Sheet 2.
E. E. L. & I. D. BOYER.
WRAPPING MACHINE.
No. 568,656. Patented Sept. 29, 1896.
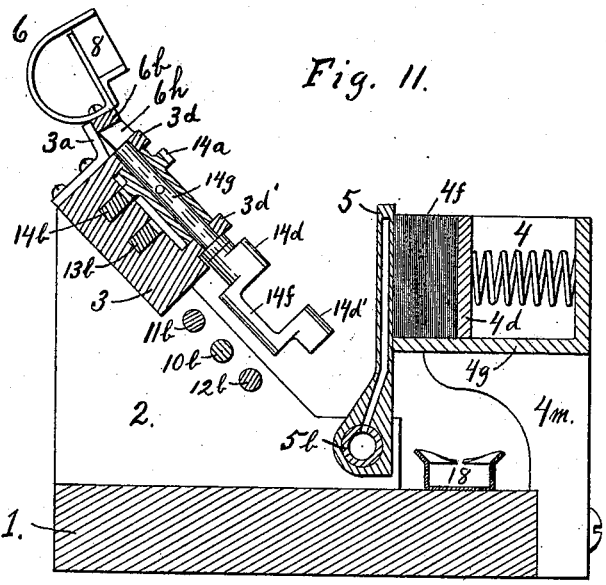
Fig. 11.
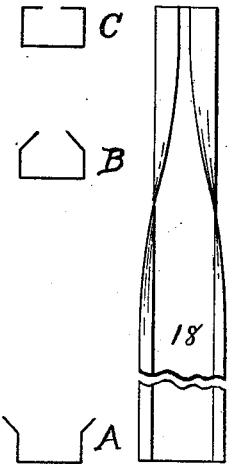
Fig. 12.
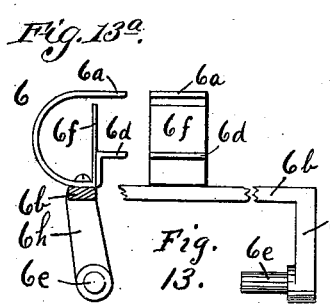
Fig. 13ª. Fig. 13.
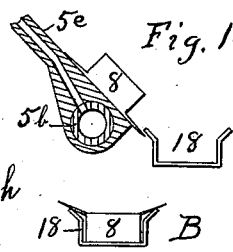
Fig. 14.
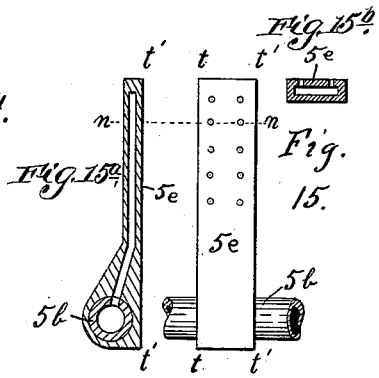
Fig. 15ᵇ. Fig. 15ᵃ. Fig. 15.
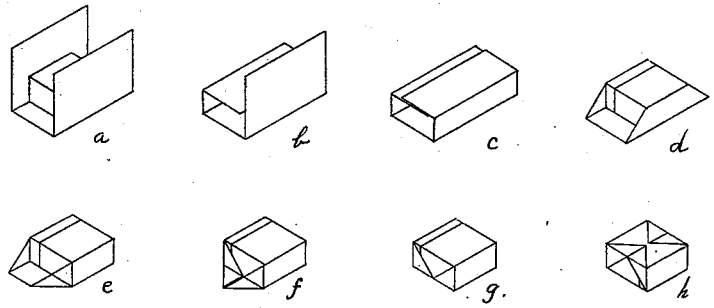
Fig. 16.
WITNESSES:
Claude N. Johnson
Bertha P. Longstreth
INVENTORS
Edith E. L. Boyer
Israel Donald Boyer
THE NORRIS PETERS CO., PHOTO-LITHO., WASHINGTON, D. C.

(No Model.)　　　E. E. L. & I. D. BOYER.　　　4 Sheets—Sheet 3.
WRAPPING MACHINE.

No. 568,656.　　　Patented Sept. 29, 1896.

WITNESSES:
Claude T Johnson
Bertha P Longstreth

INVENTORS
Edith E L Boyer
Israel Donald Boyer

THE NORRIS PETERS CO., PHOTO-LITHO., WASHINGTON, D. C.

(No Model.) 4 Sheets—Sheet 4.

E. E. L. & I. D. BOYER.
WRAPPING MACHINE.

No. 568,656. Patented Sept. 29, 1896.

Witnesses.
C. J. Longenecker.
A. J. Fiorini

Inventors.
E. E. L. Boyer.
I. D. Boyer.
By Attorney.
R. J. McCarter

UNITED STATES PATENT OFFICE.

EDITH E. L. BOYER AND ISRAEL DONALD BOYER, OF DAYTON, OHIO.

WRAPPING-MACHINE.

SPECIFICATION forming part of Letters Patent No. 568,656, dated September 29, 1896.

Application filed July 12, 1893. Serial No. 480,302. (No model.)

*To all whom it may concern:*

Be it known that we, EDITH E. L. BOYER and ISRAEL DONALD BOYER, citizens of the United States, residing at Dayton, in the county of Montgomery and State of Ohio, have invented a new and useful Wrapping-Machine, of which the following is a specification.

The object of our invention is to provide a machine which will simultaneously wrap a number of similar articles and which will deliver its product regularly arranged in rectangular groups of definite size. The articles may be pieces of candy, cakes of soap, boxes, or other regularly-shaped objects.

The machine illustrated in the drawings accompanying this specification was specifically designed for wrapping caramels; but without departing from the spirit of our invention it may easily be adapted to wrapping other articles.

It consists of a number of separate wrapping mechanisms arranged side by side, motion being communicated to the various parts by means of rods which extend entirely across the machine. Some of these rods reciprocate and others oscillate. Each rod has its own specific set of functions to perform. For instance, there is one rod for catching the sheets of paper, and all the paper-catchers are fastened to it. There is another rod for rolling over the ends of the papers, and each "roll-over" is attached to this rod. The corresponding functional parts of all the wrapping mechanisms are attached to one rod. Thus there are as many rods as there are functions to be performed in wrapping an article.

It will be readily understood that within practicable limits any desired number of wrapping mechanisms may be embodied in one machine and operated by a single system of rods. We will describe it, however, as though it were a simple machine for wrapping but one caramel at a time.

The papers being all cut to proper size and arranged in packs, one is sucked off by means of a partial vacuum and is laid down so as to form a bight. A caramel having been introduced between the jaws of a pair of light pincers or grippers is by them deposited in the bight of the paper. The jaws of a retaining-vise now close, firmly holding both the paper-bight and caramel while the various wrapping motions are being performed. When these are finished, the vise lets go and the caramel drops into a trough. It is now completely wrapped except the bending over of the triangular points of the paper, and this latter is accomplished by pushing the caramel through the trough.

In referring to the drawings reference numbers and letters are used, and the following system is observed: A number is chosen for each of the principal parts. Auxiliary parts are represented by the same number as their principal, but with a letter affixed. The letter "b" thus used indicates a bar, rod, or shaft to actuate the corresponding principal part. The letter "c" indicates a crank; the letter "s" a slot. The other letters are used indiscriminately.

It will be observed that the general views are mostly drawn to a small scale, while the details are more or less enlarged.

Figure 18:
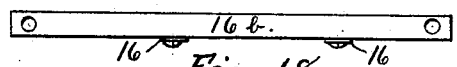
Figure 19:
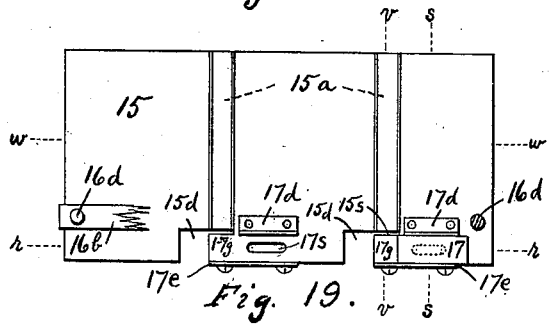
Figure 20:
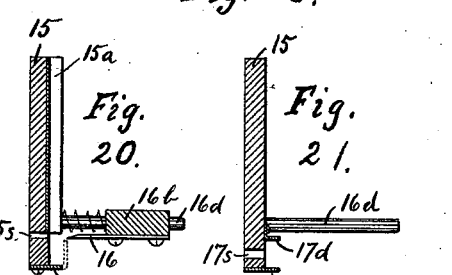
Figure 21:
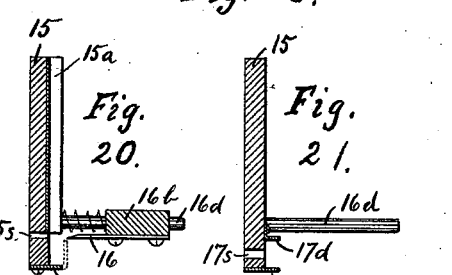
Figure 22:
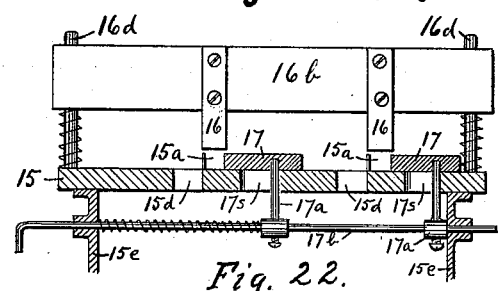
Figure 23:
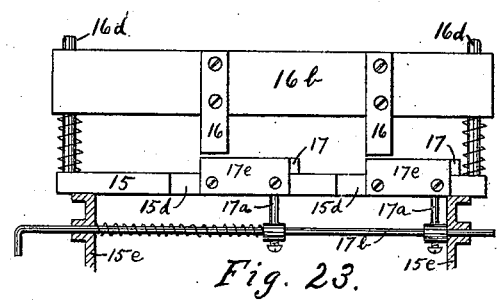
Figure 24:
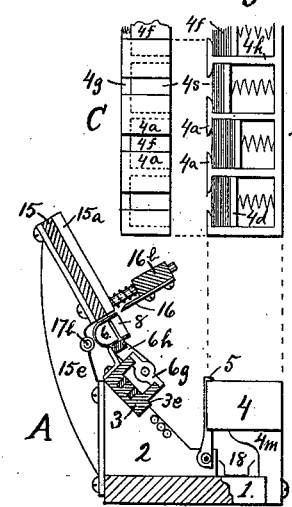
Figure 25:
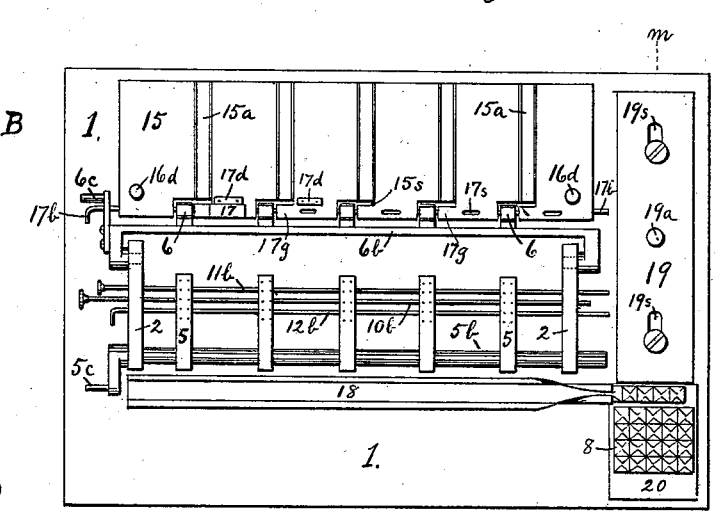
Figure 26:
Figure 27:
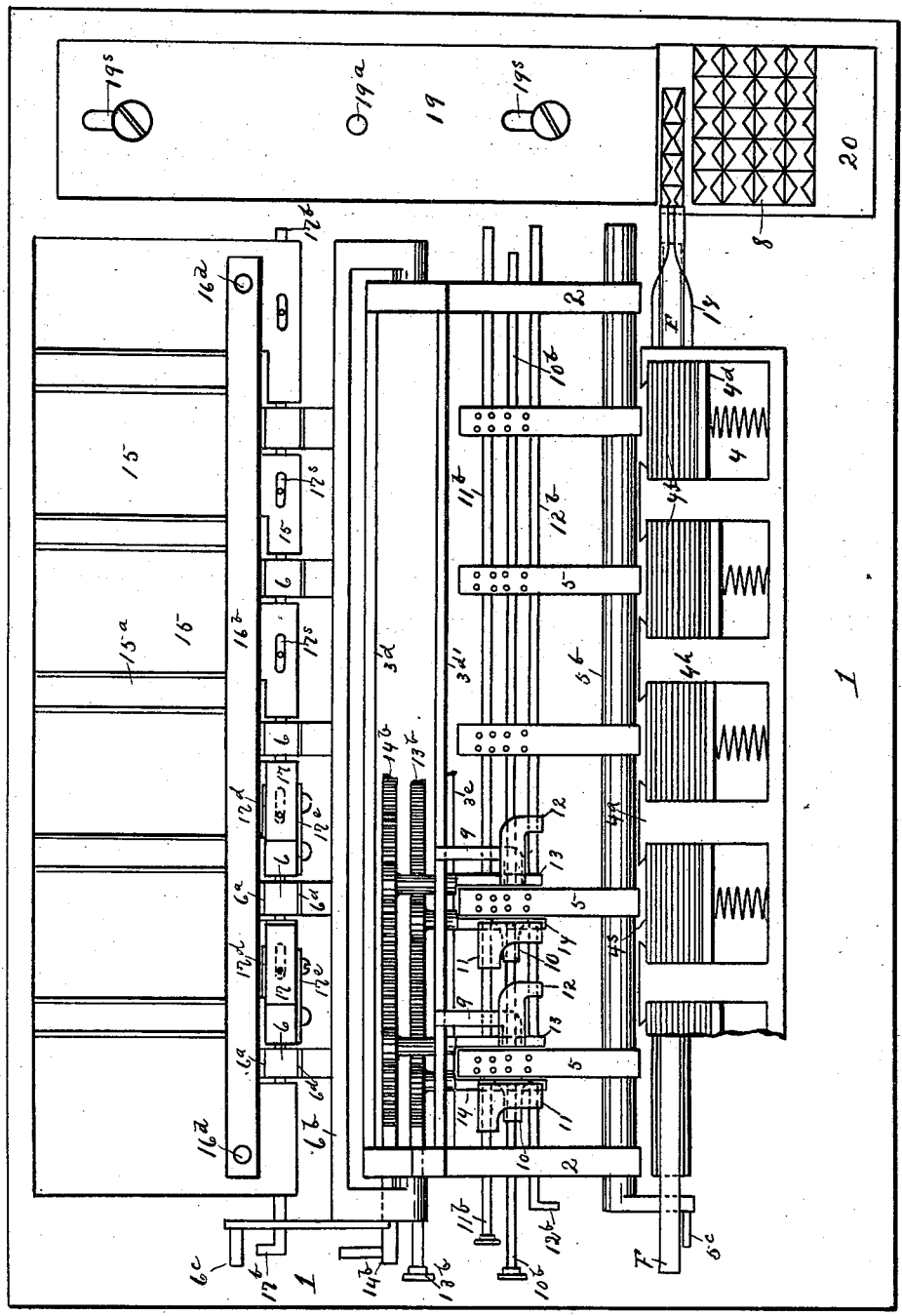

Figure 1 is a sectional end view of the machine, showing the leading features, but omitting the feed mechanism and most of the details. Fig. 2 is a diagrammatic plan view showing the leading features, but omitting details. In making this view the aim has been to clearly exhibit the mechanical relations of the various parts rather than to adhere rigidly to the rules of orthographic projection. Fig. 3 is a detail face view of the "paper-sucker" or "platen" 5, the fixed vise-jaw 9, and the two roll-overs 13 and 14 with their pinions and racks. On the platen is shown a caramel 8, lying in the position it would occupy while being folded. The paper is not shown. A section on the line $y\,y$ may be seen by referring to Fig. 7, where the caramel 8 is shown in process of being wrapped. A section on the line $x\,x$ may be seen in Fig. 9$^A$. Fig. 4 is a detail face view of the roll-overs 13 and 14 with their pinions and racks and the fixed vise-jaw 9, the same as in Fig. 3. This view, however, omits the paper-sucker or platen 5, but shows the movable vise-jaw 10, and the two "lay-down" plates 11 and 12 with their actuating-rods. The lay-down plate 11 is shown a little farther to the left than it normally belongs, and the plate 12 is shown a little farther to the right. This is done to enable parts beneath them to be seen which would otherwise be concealed by them. The normal position of these lay-down plates is shown in Figs. 6 and 8. Fig. 5 is a series of detail views of the left-hand roll-over 14, A being an edge view; B, a side view; C, a section on line $x\,x$, and D a section on the line $y\,y$. Sections on the line $y\,y$ may be seen in Figs. 6, 7, 8, and 9$^{\mathrm{B}}$. A section on the line $x\,x$ may be seen in Fig. 9$^{\mathrm{A}}$. Fig. 6 is an elevation, partly in section, on the line $y\,y$ of Figs. 3, 4, and 5. This figure shows the stationary vise-jaw 9, the movable vise-jaw 10 in its open position, the actuating-rod for it, 10$^{\mathrm{b}}$, the two lay-downs 11 and 12 with their actuating-rods 11$^{\mathrm{b}}$ and 12$^{\mathrm{b}}$, the roll-overs 13 and 14 in normal position, the paper-sucker or platen 5 in section with a piece of paper upon it forming a bight. All the parts are here shown as in position ready to receive a caramel. Fig. 7 is a view similar to Fig. 6, but at a later stage of the operation. This view shows a caramel 8 inserted in the bight of the paper, the movable vise-jaw 10 closed up, firmly holding both paper and caramel, and the left-hand lay-down 11 started inward, thus partially folding over or laying down the left-hand side of the bight. Fig. 8 is a view similar to Figs. 6 and 7, but at a later stage. The two lay-downs 11 and 12 have completed their work and have backed out again, as has also the right-hand roll-over. The left-hand roll-over has just completed its work, but has not yet backed out. As soon as it backs out it is time for the movable vise-jaw to back off and allow the caramel to drop out into the trough, as will be hereinafter explained. From this figure can be seen how the left-hand roll-over 14 and the movable vise-jaw 10 clear each other. Fig. 9 shows two sectional views of the roll-overs and the paper-sucker or platen 5. Fig. 9$^{\mathrm{A}}$ is a section on the line $x\,x$ of Figs. 3 and 5, with the roll-overs in normal position. Fig. 9$^{\mathrm{B}}$ is a section on the line $y\,y$ of Figs. 3 and 5, the left-hand roll-over being in normal position, while the right hand one is shown as just rolled over. This view shows also the fixed vise-jaw 9, illustrating how the roll-over and vise-jaw clear each other. Fig. 10 comprises a side view A and a sectional view B of the placer-bar 6$^{\mathrm{b}}$. Fig. 11 is a sectional end elevation showing the paper-sucker or platen 5 in vertical position with its plane face resting against the first sheet of paper of the pack 4$^{\mathrm{f}}$. This view also shows a caramel 8 in the "placer" 6. Fig. 12 comprises a top view of the delivery-trough 18, together with three sectional views of the same, the sectional views being located opposite the points at which they are supposed to be sections. Figs. 13 and 13$^{\mathrm{a}}$ show a side view and a plan view of the placer 6, together with a portion of its actuating-bar 6$^{\mathrm{b}}$. Fig. 14 is a sectional view of the delivery-trough 18 and the lower part of the paper-sucker or platen 5, showing their relative positions and the manner in which a caramel sliding down the platen strikes the trough. Fig. 14$^{\mathrm{B}}$ shows how the caramel lies in the trough bottom side up, with the triangular points of the wrapping material projecting outwardly over the flanges of the trough. Figs. 15, 15$^{\mathrm{a}}$, and 15$^{\mathrm{b}}$ comprise three detail views of the paper-sucker or platen 5—a face view, a longitudinal section, and a transverse section on the line $n\,n$. Fig. 16 is a series of isometric views showing the successive stages of the wrapping process. Fig. 17 is a section of the feed-board on the line $w\,w$ of Fig. 19. Fig. 18 is a plan view of the chisel-bar with two chisels attached. Fig. 19 is a plan view of the feed-board of a duplex machine. Fig. 20 is a sectional view on the line $v\,v$ of Fig. 19. This view is orthographically projected from Fig. 19. Fig. 21 is a sectional view on the line $s\,s$ of Fig. 19, omitting the chisel-bar. This view is also projected orthographically from Fig. 19. Fig. 22 is a sectional view on the line $r\,r$ of Fig. 19, showing the chisel-bar, the chisels, and the feed-blocks 17. Fig. 23 is the same as Fig. 22, except that the feed-board is shown in exterior edge view instead of in section. Fig. 24$^{\mathrm{A}}$ is a sectional end elevation of the machine with feed-board and chisels attached, showing the general features, but omitting details. Fig. 24$^{\mathrm{B}}$ is a plan view of the paper-boxes orthographically projected from Fig. 24$^{\mathrm{A}}$. Fig. 24$^{\mathrm{C}}$ is a face view of the paper-boxes orthographically projected from Fig. 24$^{\mathrm{B}}$. Fig. 25 is a diagrammatic plan view of a quintuplex machine with feed-board attached, but omitting the chisel-bar. This view also shows the placers 6, the paper-suckers or platens 5, the delivery-trough 18, the "flanking-pusher" 19, and a group of finished caramels 8, lying in order on a tin plate 20. The paper-boxes and most of the details are omitted. For the sake of clearness and simplicity the parts are shown as though they lay in one plane. The cross-frame 3 is not shown. The placer-bar 6$^{\mathrm{b}}$ is shown as having its bearings in the end frames 2. Fig. 26 is a section on the line $m\,m$ of Fig. 25. It shows the flanking pusher or "grouper" 19 and a group of wrapped caramels 8 on a tin delivery-plate 20. Fig. 27 is a general plan view of the machine, parts being removed to reveal the mechanism therebelow.

Of the various reference-numbers used, 1 represents the base of the machine; 2, the end frames.

3 represents a cross-frame connecting the two end frames and having slots planed in it forming bearings and guides for the rack-bars 14$^{\mathrm{b}}$ and 13$^{\mathrm{b}}$.

4 is the paper-box or series of paper-boxes.

5 is the paper-sucker or platen.

6 is the gripper or placer for receiving the article and delivering it to the wrapping mechanism.

8 is the caramel.

9 is the stationary jaw of the retaining-vise.

10 is the movable jaw of the retaining-vise.

11 is the first or left-hand lay-down plate.
12 is the second or right-hand lay-down plate.
13 is the first or right-hand roll-over.
14 is the second or left-hand roll-over.
15 is the feed-board.
16 is the chisel.
17 is the feed-block.
18 is the delivery-trough.
19 is the flanking-pusher or grouper.
20 is the delivery-plate.

The paper-sucker or platen is shown in detail in Figs. 15, 15$^a$, and 15$^b$. It is a hollow arm 5, having one smooth plane face 5$^e$, which is approximately of the same width as the caramel and which is perforated with a number of small holes, as may be seen in the face view and in the transverse section. This arm is soldered to a tubular shaft 5$^b$ in such manner that its interior chamber communicates with the bore of the shaft. This shaft extends entirely across the machine and has its bearings in the end frames. If there be more than one platen, they are all soldered to the shaft between the bearings. At its left-hand end this shaft is provided with a crank 5$^c$. (See Figs. 2, 25, and 27.) At this end the bore is sealed; but at the other end it remains open and is connected by a pipe with a chamber in which a partial vacuum is maintained by the continuous action of an air-pump. In this connecting-pipe there is a valve by which communication between the platen and the exhausted chamber may be either established or cut off. The vacuum-chamber, the connecting-pipe, and the valve are not illustrated because they present no novel features and would overload the drawings. Moreover, any skilled mechanic knows how to make the connections.

Normally the paper-sucker or platen rests at an angle of about forty-five degrees, with its outer end supported by the ledge 3$^c$ of the cross-frame 3. (For the ledge 3$^c$, see Fig. 24, also Figs. 3 and 4. For the sucker or platen resting on this ledge, see Figs. 1 and 3.) By means of the crank 5$^c$ the shaft 5$^b$ may be turned through an angle of about forty-five degrees or until the platen comes into a vertical position with its plane perforated face bearing against the foremost sheet of paper in the paper-box 4. (See Figs. 11 and 24, also dotted lines in Fig. 1.) The construction of this box will be described farther on. At present suffice it to say that when the platen attains this position the operator opens the suction-valve, whereupon the platen instantly seizes the first sheet of paper. The operator now brings the platen back to normal position with the sheet of paper clinging to its plane face 5$^e$; but the sheet of paper is not permitted to lie flat for the platen normally lies in a sort of a niche formed by the surrounding mechanism. This will be more apparent farther on after the other mechanism has been explained. As the paper is dragged into this niche the ends are obliged to bend upward, thus forming a bight, as shown in Fig. 6, where the platen is represented as having just returned "home" with a sheet of paper fast to its face. The paper is now in position ready to receive a caramel.

Proceeding now to the placer, it will be seen detailed in Fig. 13, it may be described as a pair of delicate grippers or mechanical fingers for receiving and holding the caramel and for placing it in the bight of the paper on the platen. It is made of two pieces of sheet metal bent as shown in the figures. The portion 6$^f$ forms the "floor."

6$^a$ is the outer jaw, which is quite elastic by reason of the great bend.

6$^d$ is a separate piece of metal soldered on. It forms the inner jaw.

The placer, or, if there be more than one, the placers, are screwed fast to a bar 6$^b$, which may be seen in Figs. 13 and 10. This is a flat bar of metal having its ends bent at right angles and journals 6$^e$ formed on them. These journals have their bearings in boxes 6$^g$, fastened to the ends of the cross-frame 3. (See Figs. 1, 2, and 24.) The placer-bar 6$^b$ is in reality a long crank. It is made in this shape to enable it to swing clear of intervening mechanism. Other views of this bar with placers attached may be seen in Figs. 1, 2, 11, 24, and 25. In Figs. 1, 11, and 24 a caramel may be seen in position in the placer, resting against the floor 6$^f$ and held by the jaws 6$^a$ 6$^d$. By means of the crank 6$^c$ the placer-bar, and with it the placers, may be turned through an angle of nearly one hundred and eighty degrees. This is indicated by the dotted arc in Fig. 1. The dotted rectangle on the platen indicates the caramel in its new position as deposited by the placer. Theoretically the axis 6$^e$ 6$^e$ should lie in a plane which is parallel to the face 5$^e$ of the platen and which passes through the center of the caramel as it lies in position on the platen. When the axis is thus located, the arcs described by the placer-jaws 6$^a$ 6$^d$ coincide sensibly with the two gripped faces of the caramel, and the placer may be backed off with the least resistance. (See dotted arc and dotted caramel on the platen in Fig. 1.) A certain amount of deviation from the theoretical position is permissible, but such deviation causes less perfect working.

Later on will be described a method of feeding the caramels or other articles to the placer, but at present we will suppose that function to be performed by hand. The normal position of the placer is shown in Figs. 1, 11, and 24, its bar 6$^b$ resting against a stop 3$^a$ on the cross-frame 3.

After the platen has brought home its sheet of paper and formed a bight, as before explained, the placer with a caramel in it is brought down, as indicated by the dotted lines in Fig. 1, thus introducing the caramel between the jaws 9 and 10 of a retaining-vise. The right-hand jaw 9 is immovable, being fastened to the rib 3$^{d'}$ of the cross-frame 3.

(See Figs. 3, 4, 6, 7, 8, and 9ᴮ.) The left-hand jaw 10, Figs. 4, 6, 7, and 8 is fastened to the rod 10ᵇ, which has a limited endwise motion in its bearings in the end frames 2. It is a rather tight fit in its bearings, so that it works under a friction and will remain where it is placed. In Fig. 6 the jaw 10 is seen withdrawn, so that it does not touch the paper. It is in this position when the caramel enters, but as soon as the caramel is in the operator pushes on rod 10ᵇ, thus moving the jaw 10 firmly against the paper, thereby securely holding both paper and caramel. As soon as the retaining-vise has hold of the caramel the operator closes the vacuum-valve, thus cutting off the hollow interior of the platen from the exhausted chamber and avoiding undue waste of the vacuum. The placer is now backed off to its normal position, leaving the caramel on the platen firmly held by the jaws 9 and 10 of the retaining-vise. The placer may be easily backed off, seeing that it holds the caramel but lightly while the jaws 9 and 10 hold it firmly. The parts are now in the situation shown in Fig. 7, except that the ends of the paper are still standing straight up, as shown in Fig. 6. The wrapping is now at the stage $a$, Fig. 16.

A sheet-metal plate 11 next comes into play. This we designate the "left-hand laydown" because its function is to lay down the upstanding end of the paper-bight. The shape of this plate may be seen in Fig. 4. It is carried by the rod 11ᵇ through the intermediation of a standard 11ᵃ. (See Figs. 6, 7, and 8.) The rod 11ᵇ is pushed in, thus carrying the plate 11 over the top of the caramel and laying down the upstanding paper end. In Fig. 7 this plate is shown as having just started on its movement, the paper being bent part way down. When it has traveled entirely across the caramel, the operator begins to back it off. At the same time he starts to pulling rod 12ᵇ, (which, through the intermediation of a standard 12ᵃ, carries the right-hand lay-down 12,) causing the plate 12 to follow the receding plate 11 across the top of the caramel, thus laying down the right-hand side of the bight. Just after the left-hand lay-down 11 has completed its forward motion the caramel is in the stage illustrated in Fig. 16ᵇ. After the right-hand lay-down 12 has completed its forward motion the caramel is in the stage shown in Fig. 16ᶜ. The shape of the right-hand lay-down may be seen in Fig. 4. It will be observed that the left-hand lay-down 11 has a wide edge—wide enough to contact with the paper throughout the whole length of the latter. The right-hand lay-down 12 is narrow, being only about as wide as the caramel. Hence it pushes the paper in the center only. The reason of this will be explained farther on. The left-hand lay-down was backed off immediately it had finished its forward motion. Not so the right-hand one. It remains over the caramel until all the remaining parts have performed their offices. It is allowed to remain thus long so as to hold the paper down close to the caramel during the remaining operations, preventing it from coming loose, as might otherwise happen.

We left the caramel in stage $c$, Fig. 16, the right-hand lay-down having just completed its forward motion. The operator next causes the empty placer to descend again. This time its function is to bend down the ends of the paper over the still-uncovered ends of the caramel, converting stage $c$ to stage $d$, Fig. 16. It is to enable the placer to come down the second time that the right-hand lay-down 12 is made narrow, as it is evident that the jaws 6ᵃ and 6ᵈ of the placer must straddle the plate 12, which remains over the caramel. As soon as it has bent down the ends of the paper the placer is again returned to normal position. The next operation is to push and pull rod 13ᵇ. This causes the right-hand roll-over to do its work and return to normal again. The construction and operation of the roll-overs will be explained more in detail hereinafter. Their function is to fold the paper at the ends, forming the triangular point. After the first or right-hand roll-over has done its work the caramel is in the stage $e$, Fig. 16. The operator now reciprocates rod 14ᵇ, first pulling and then pushing it. This causes the left-hand roll-over to perform its part and return to normal, putting the caramel in stage $f$, Fig. 16. The right-hand lay-down 12 is now backed off by pushing in rod 12ᵇ. A pull on rod 10ᵇ loosens the vise, and the released caramel immediately slides down the inclined face 5ᶜ of the platen, landing bottom side uppermost in the delivery-trough 18.

Fig. 14 shows the caramel sliding down the inclined face of the platen and just about to strike the trough. It will be observed that the relative position of trough and platen is such that the projecting point of the paper on the caramel goes under the splayed flange of the trough 18. The body of the caramel then comes down and strikes the edge of the trough. As the line of motion of the caramel's center of gravity passes above the striking-point the momentum of the caramel causes it to turn over and to land in the trough in a position substantially as shown at B, Fig. 14. The caramels are pushed through this trough with a stick or bar F, (see Fig. 27,) and when they emerge from the far end they are completely wrapped, as shown in Fig. 16ʰ. (See also Fig. 25.) Fig. 16ᵍ shows a completely-wrapped caramel turned other side up.

The trough 18 is made of sheet metal and is of changing section. (See Fig. 12.) The end in which the caramels fall has the section shown at A. At the end where they emerge the section is as shown at C. The section gradually changes from the one to the other, as indicated in the shaded plan view, Fig. 12. (See also view of trough in Fig. 25; also in Fig. 11.)

It should be remarked that if for any reason the caramel should fail to slide down the trough as soon as the vise relaxed its hold then the swinging of the platen into a vertical position to catch the next sheet of paper would be sure to dump the caramel into the trough. It is not absolutely essential that the trough have a splayed flange, as shown. A plain rectangular trough without any flange will do to catch the caramels as they slide down the inclined faces of the platens. Such a plain trough will cause the caramels to turn over into it; but from certain experiments which we have made we believe that a splay-flanged trough gives more satisfactory results.

On a multiplex machine a number of caramels fall simultaneously into the trough 18. The whole line of them is then pushed through the trough, whence they emerge on a tin plate 20, Figs. 25 and 26, directly in front of the flanking-pusher or grouper 19. This latter is merely a flat piece of wood attached loosely to the base-plate 1 by means of screws through the slotted holes 19$^s$. It has a projecting pin 19$^a$, which serves as a handle by which it may be reciprocated through a space determined by the slotted holes. Its function is as follows: The caramels emerge from the trough in a row directly before the end of the grouper, which is then pushed forward, moving the whole row bodily sidewise through a short space. It is then returned to normal, thus leaving a passage for another row of caramels as they emerge from the trough. This second row is then pushed over in the same manner. The second row will of course strike the first row and will push it a little farther. Then a third row follows and is pushed over. It strikes the two preceding rows and moves them a little farther, and so on until a rectangular group of definite size is formed. In Fig. 25 four rows are shown as having been thus pushed over, while a fifth is just emerging from the trough. In this figure the base-plate 1 is much exaggerated in size. This is done for the sake of clearness, as otherwise its lines would come under or would interfere with other lines. The cross-frame 3 is omitted, and the placer-bar 5$^b$ is represented as having its bearings in the end frames 2. It should be remembered that this figure is not an orthographic projection, but an illustrated diagram. Taken as such and in connection with the other views and explanations we believe it will convey much more information than could be imparted by a true orthographic projection.

The size of the group desired and the size of the tin delivery-plate are usually made to conform the one to the other. Thus when the plate is full the group is complete and the operator removes the full plate and substitutes an empty one.

In Fig. 26 a small rabbet 19$^d$ is shown cut on the under side of the acting end of the grouper. This is to enable the grouper to clear the tin plate 20 as it slides forward over it. It is much exaggerated in the drawings, as the thickness of the tin is insignificant. The tin plate is stuck slightly under the end of the trough 18, so that the line of caramels meets no obstruction as it emerges from the trough onto the plate.

It may be well here to explain the construction and action of the roll-overs 13 and 14. They are both similar to each other, but are reversed, or are "rights" and "lefts," as it is commonly expressed. This being premised, a description of one of them will answer for both. The left-hand roll-over 14 is illustrated in Fig. 5. It consists of a cylindrical shank 14$^g$, a collar 14$^e$, and a flat portion of irregular shape 14$^d$ 14$^f$ 14$^{d'}$. 14$^d$ 14$^{d'}$ are the two working faces. It is they which roll over and press down the ends of the paper, forming the triangular point, as seen in Fig. 16$^f$. These two working faces lie in one plane, and this plane contains the axis. They are connected together by an arm or bar of metal 14$^f$, which lies in the same plane with them. (It is not necessary that it should lie in the same plane. All that is essential is that it should properly clear other parts as the roll-over oscillates.) When in normal position, this plane is vertical, the working faces being above and the connecting-arm below the axis. (See Figs. 6, 7, and 9$^A$.) In order to fold the corners of the paper, the roll-over is given a quarter-turn, bringing its working faces parallel to and very close to the face 5$^e$ of the platen. In Fig. 8 the left-hand roll-over is shown in this position, and in Fig. 9$^B$ the right-hand one is so shown. It will be understood that when in this position the working face 14$^d$ is at the upper end of the caramel, and 14$^{d'}$ is at the lower end of the caramel as it lies on the inclined platen and between the two faces 14$^d$ 14$^{d'}$. (See Fig. 11.) The shank 14$^g$ has its bearings in the two ribs 3$^d$ 3$^{d'}$ of the cross-frame 3 and is so located that its axis lies as nearly as may be in the prolongation of the left-hand edge $tt$ of the platen-face 5$^e$. (See Figs. 3, 4, 9, 11, and 2.) Between the two ribs 3$^d$ 3$^{d'}$ a pinion 14$^a$ is pinned to the shank 14$^g$. This pinion meshes with the rack cut on the bar 14$^b$, and this explains how the reciprocating of that bar causes the roll-over to do its work. The pinion 14$^a$ has a long hub which just fills the space between the ribs 3$^d$ and 3$^{d'}$. It thus serves to retain the roll-over against endwise motion. In order to cause the roll-over to oscillate, it is not necessary to employ the rack-bar 14$^b$, as there are a number of mechanical equivalents. Neither is it necessary that the bar 14$^b$ should reciprocate, as the roll-overs may be actuated by an oscillating rod, if desired. We, however, prefer the construction illustrated.

As explained above, the axis of the roll-over lies in the plane of the working faces and coincides as nearly as may be with the edge of the platen-face 5$^e$; but neither of these conditions is absolutely esssential, as the roll-over will work if both be departed from to a certain extent, but it is more desirable to make it as described.

In Fig. 8 may be seen how the movable vise-jaw 10 and the left-hand roll-over 14 clear each other. Fig. 9$^B$ shows how the stationary vise 9 and the right-hand roll-over 13 clear each other.

Referring now to Figs. 3, 4, and 6, (other figures also show it,) it will be seen how the roll-overs, the vise-jaws, and the lay-down plates combine to form a sort of niche into which the platen drags the sheet of paper, thereby forming a bight, as heretofore explained.

In Fig. 24 is represented a paper-box with a number of compartments separated by partition-walls 4$^h$. In the front end of each compartment is placed on edge a pack of papers 4$^f$. Behind each pack is a follower or platen 4$^d$ and a spring which keeps the pack pressed closely against the front wall 4$^a$ of the box. This front wall is not continuous, but has a break in the center of each compartment, forming a slot or opening 4$^s$. The paper bridges this opening, and the platen 5, swinging into it, comes in contact with the first sheet. In Fig. 24$^A$ the platen is shown in this position. Views B and C (of Fig. 24) show the other features. 4$^g$ is the bottom of the box. 4$^m$ are brackets or standards to support the box. (See also Figs. 1 and 11.)

We may now describe the method of feeding the caramels to the placers. To the back of the machine are attached two brackets 15$^e$, Fig. 24$^A$. They are screwed to the end frames 2 and support the feed-board 15 at an angle of about sixty degrees to the horizontal, substantially as shown in Fig. 24$^A$. On the top surface of the feed-board are located the feed-troughs 15$^a$. (See Figs. 17, 19, 20, 22, 24$^A$, and 25.) These troughs are made of sheet metal. A strip of caramel-dough is laid in each trough. Owing to the inclination of the feed-board the lower end of each strip will rest against one of the sheet-metal stops 17$^c$. (See Figs. 19, 20, 21, and 23.) Across the top surface of the feed-board extends a wooden bar 16$^b$, which has attached to it a number of chisels 16. One chisel is located immediately over the lower end of each feed-trough 15. (See Figs. 20, 22, 23, and 24$^A$.) The chisel-bar slides up and down on the guide-rods 16$^d$, being normally held up by the helical springs shown. Immediately under each chisel is a narrow slot 15$^s$ in the feed-board. (See Figs. 19, 20, and 25.) This is for the end of the chisel to run into after it has passed through the caramel-dough. When the strips are all in place in the feed-troughs 15$^a$, the chisel-bar is pushed down with a rather rapid movement. This cuts a little square cake off of each stick. The helical springs then return the chisel-bar to normal position. To prevent the cut off caramel from being dragged up with the returning chisel, we usually construct the stop-plate 17$^c$ with a rectangular bend in it, as indicated by dotted lines in Fig. 20. This forms a sort of roof over the cut off caramel and prevents it from lifting when the chisel returns. It also serves to hold down the feed-block 17. A similar provision prevents the end of the strip from lifting out of the feed-trough 15$^a$; but we do not consider it necessary to illustrate this, as it is an obvious expedient readily applied by any one.

Each caramel as it is cut off lies on a little shelf 17$^g$, Figs. 19 and 25, immediately beside a feed-block 17. This latter is simply a rectangular block of wood arranged to slide on the feed-board 15, between two pieces of sheet metal 17$^e$ and 17$^d$, which serve as guides for it. Underneath the feed-blocks 17 and beneath the feed-board 15 is the feed-rod 17$^b$. It carries upwardly-projecting fingers 17$^a$, which reach through slots 17$^s$ in the feed-board, and so take hold of the feed-blocks 17, as may be seen in Fig. 22. When the rod is pulled, the feed-blocks are all moved to the left, and the whole lot of cut-off caramels would be dumped off the feed-board through the openings 15$^d$ were it not that just at this time the placers are in these openings with their floors 6$^f$ on a level with the top surfaces of the shelves 17$^g$. (See Figs. 24 and 25.) Hence instead of falling off the board the cut-off caramels are lodged in the placers. The rod 17$^b$ is now released when the helical spring shown returns it to normal. As soon as the feed-block returns to normal the caramel-strip in the feed-trough 15$^a$ falls down (being deprived of the support of block 17) until it again rests on the stop 17$^c$. The chisel is again brought down and the cycle repeated. By slight modification of details it might be arranged that a single long knife be substituted for the series of separate chisels 16.

Isolated articles might be fed to the machine in a similar manner—viz., by placing a row of them in the feed-trough 15$^a$, and then, by means of the feed-block 17, pushing the lowermost one into the placer, as already explained. In this case, of course, we should not need the chisels.

Certain articles might be best fed into the gripper or placer 6 directly by hand without the intervention of the feed-block 17. Large articles, such as packages or boxes, it might be advisable to place by hand immediately into their proper position for being wrapped, thus dispensing with feed-trough, feed-block, and placer.

We do not consider it incumbent upon us to use a number of folding mechanisms in conjunction, as there might be occasions on which it would be preferable to use but a single one. In certain cases we might also prefer to dump the folded articles in a heap rather than to deliver them in regular groups.

All such matters of detail we would leave to be arranged in the manner which might seem most suitable in any special case.

Having thus described our invention, what we claim is—

1. In a wrapping-machine, the combination with the folding mechanism, of a placer movable in an arc of a circle and adapted to deposit an article to be wrapped, in a position to be acted upon by said folding mechanism, and to return to said article to tuck the ends of the wrapper downwardly against the ends of said article, and means for laterally moving said article onto said placer.

2. In a wrapping-machine, the combination with the jaws 9 and 10 a lay-down plate 11, and a substantially narrower lay-down plate 12, of a placer 6 provided with jaws $6^a$ and $6^d$ which are adapted to deliver articles to be wrapped, between the jaws 9 and 10 and to straddle the narrower plate 12, embrace said article and tuck down the ends of the wrapping material over it.

3. In a wrapping-machine, the combination of a pivotal inclined platen 5 and a delivery-trough 18 the latter situated adjacent to the lower end of said platen and having its upper edge projecting above the plane of said platen, and means for wrapping an article prior to its advent into said trough.

4. In a wrapping-machine, the combination of an oscillating platen adapted to pick up wrappers sheet by sheet, and to support the article to be wrapped therein, oscillating roll-overs 13 and 14 on each side of said platen, the axes of said roll-overs coinciding approximately with the two straight edges of the platen, and the working faces thereof normally standing approximately perpendicular to the face of the platen, substantially as described.

5. In a wrapping-machine, the combination with an inclined platen 5, of roll-overs 13 and 14 each of which is journaled at its upper end and has its lower end provided with two plain faces with an intermediate gap between them adapted to contain an article to be wrapped while each of the roll-overs performs its function, and means for holding said article in place while being wrapped and to release it when the wrapping is completed, substantially as described.

6. In a wrapping-machine, the combination of an oscillable platen 5, retaining-jaws 9 and 10, oscillable roll-overs 13 and 14, and a pair of reciprocable lay-down plates 11 and 12, said roll-overs, lay-down plates and jaws, forming together, a niche in the bottom of which said platen normally lies, and into which it is adapted to draw a wrapper that forms a bight, substantially as and for the purposes specified.

7. In a wrapping-machine, the combination of an oscillating platen, jaws inclosing the sides thereof, the said platen and jaws being adapted to hold an article while it is being wrapped, devices for wrapping said article, and means for receiving the article from said platen when wrapped.

8. In a wrapping-machine, an oscillable platen adapted to attract wrappers by suction, in combination with devices into which said platen is adapted to pass with said wrappers and to form a bight of each wrapper and devices adapted to successively fold the ends and sides of said wrappers around the articles.

9. In a wrapping-machine, the combination with an actuating-shaft $5^b$, of an oscillable platen 5 provided with a vacuum-chamber by means of which the said platen is adapted to attract a wrapper, a niche into which said platen carries said wrapper, a placer adapted to deposit an article to be wrapped, upon said platen, and means for bringing said platen into a position to form an inclined way for the wrapped article to slide upon, substantially as described.

10. In a wrapping-machine, the combination of a roll-over provided with two plane working faces $14^d$ and $14^{d'}$ with an intervening crank-shaped arm $14^f$, a placer 6, and oscillable arm or platen 5, substantially as described.

11. In a wrapping-machine, the combination with an oscillable platen 5 adapted to alternately receive a wrapper and an article to be wrapped, of a roll-over 14 for forming a triangular point on the wrapper, said roll-over consisting of a shaft $14^g$ and two plane working-faces $14^d$ and $14^{d'}$ said faces being separated from each other by an interval or gap of sufficient space to admit of the article between them so that one of said faces may operate at one end of the article while the other is similarly engaged at the other end of said article.

12. In a multiplex wrapping-machine, a series of perforated hollow platens each of which is attached to a tubular shaft with its interior chamber communicating with the bore of said shaft, in combination with a series of placers 6 adapted to deliver articles upon said platens, and devices for wrapping said articles, substantially as described.

13. In a multiplex wrapping-machine, a series of inclined platens 5 assembled side by side and forming a continuous line, a series of placers 6 adjacent to said platens, in combination with a horizontal trough extending across the machine adjacent to the foot of said row of inclined platens and adapted to receive the wrapped articles therefrom and devices for wrapping said articles, substantially as described.

14. In a multiplex wrapping-machine, an actuating-rod $14^b$ in combination with a series of roll-overs 14, a series of hollow and perforated platens adapted to pick up wrappers and to support articles to be wrapped a series of placers 6, and alternately-sliding plates 11 and 12, and means for actuating said devices.

15. In a wrapping-machine an inclined feed-trough 15ª, a chisel 16, a platform or shelf 17ˢ and a feed-block 17 all in combination substantially in the manner and for the purpose specified.

16. In a wrapping-machine the combination of a pair of vise-jaws 9 and 10, an inclined platen 5 and a pair of roll-overs 13 and 14 journaled at their upper ends and having their lower ends formed into plane faces which normally stand erect at either side of the platen, forming walls as it were; the platen, the vise-jaws and the roll-overs together constituting an inclined chute which gives the wrapped article free egress from the wrapping mechanism substantially as specified.

17. In a wrapping-machine the combination of an inclined platen 5 and a pair of roll-overs 13 and 14; each roll-over journaled at its upper end and having its lower end composed of two plane faces with a gap between them for the article to lie in while the roll-over performs its office; the plane faces normally standing erect at the sides of the inclined platen, giving a clear passage for the wrapped article as it slides down the inclined face of the platen, and means for holding the article in place during the wrapping thereof, and for releasing it after said wrapping is completed, substantially as specified.

18. In a wrapping-machine the combination of a movable supporting-platen 5, a pair of retaining vise-jaws 9 and 10, a pair of oscillable roll-overs 13 and 14, and a pair of reciprocable lay-down plates 11 and 12; the roll-overs, the lay-down plates, and the vise-jaws together forming a niche in the bottom of which the platen normally lies and into which it drags a sheet of paper, forming a bight and means for securing the wrapper to the platen, substantially in the manner and for the purpose specified.

19. In a wrapping-machine an inclined platen to hold the article while being wrapped and forming a chute for it to slide down when the wrapping motions are completed, devices for wrapping said article and for holding them upon said platen during the wrapping operation, substantially as described.

EDITH E. L. BOYER.
ISRAEL DONALD BOYER.

Witnesses:
GEO. R. YOUNG,
WILLIAM H. YOUNG.